United States Patent
Kobayashi et al.

(10) Patent No.: US 10,023,069 B2
(45) Date of Patent: Jul. 17, 2018

(54) BATTERY PACK FOR ELECTRIC VEHICLE

(71) Applicant: HONDA MOTOR CO., LTD., Minato-ku, Tokyo (JP)

(72) Inventors: Naoki Kobayashi, Niiza (JP); Kota Ejiri, Wako (JP); Kazumi Shibata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/660,225

(22) Filed: Jul. 26, 2017

(65) Prior Publication Data

US 2018/0029493 A1     Feb. 1, 2018

(30) Foreign Application Priority Data

Jul. 29, 2016  (JP) ................ 2016-149479

(51) Int. Cl.
   *B60L 11/18*    (2006.01)
   *B60K 1/04*     (2006.01)
   *H01M 2/10*     (2006.01)

(52) U.S. Cl.
   CPC ............ *B60L 11/1864* (2013.01); *B60K 1/04* (2013.01); *B60L 11/1877* (2013.01); *B60L 11/1879* (2013.01); *H01M 2/1077* (2013.01); *H01M 2/1083* (2013.01)

(58) Field of Classification Search
   CPC .............. B60L 11/1864; B60L 11/1877; B60L 11/1879; B60K 1/04; H01M 2/1077; H01M 2/1083
   USPC ....................................... 180/68.5
   See application file for complete search history.

(56) References Cited

U.S. PATENT DOCUMENTS

| | | | | |
|---|---|---|---|---|
| 2,870,855 | A * | 1/1959 | Hildreth .................. | B60R 16/04 180/68.5 |
| 3,821,997 | A * | 7/1974 | Sieren ..................... | B60R 16/04 180/68.5 |
| 5,806,618 | A * | 9/1998 | Luode ..................... | B60K 1/04 180/68.5 |
| 7,025,160 | B2 * | 4/2006 | Awakawa ............... | B60K 1/04 180/68.5 |

(Continued)

FOREIGN PATENT DOCUMENTS

| | | |
|---|---|---|
| JP | H07-52660 A | 2/1995 |
| JP | H07-81432 A | 3/1995 |

*Primary Examiner* — John D Walters
(74) *Attorney, Agent, or Firm* — Carrier Blackman & Associates, P.C.; William D. Blackman; Joseph P. Carrier (57) ABSTRACT

A battery pack for an electric motor comprises a base plate, a plurality of rectangular battery modules positioned laterally one next to another, a securing strap provided for each battery module and including an upper portion extending along an upper surface of the corresponding battery module in a fore and aft direction, a front portion extending downward from a front end of the upper portion along a front surface of the corresponding battery module, a rear portion extending downward from a rear end of the upper portion along a rear surface of the corresponding battery module, a front mounting portion formed in a lower end of the front portion and secured to the base plate, a rear mounting portion formed in a lower end of the rear portion and secured to the base plate. A connecting plate extends laterally and is fixedly connected to the securing straps.

13 Claims, 7 Drawing Sheets

(56) References Cited

U.S. PATENT DOCUMENTS 9,472,791 B2 * 10/2016 Ojeda .................. B60K 1/04
9,887,440 B2 *  2/2018 Kubota ............... H01M 10/613

* cited by examiner

BATTERY PACK FOR ELECTRIC VEHICLE

TECHNICAL FIELD

The present invention relates to a battery pack for an electric vehicle, and in particular to a battery pack for a small electric vehicle.

BACKGROUND ART

In a known battery pack for an electric vehicle, a plurality of rectangular battery modules are placed on a base plate supported by the vehicle in a grid pattern, and each column of battery modules are jointly secured to the base plate by a strap extending in the fore and aft direction of the vehicle. See JPH07-52660A and JPH07-81432A, for instance.

In such a conventional battery pack, each securing strap is attached to the parts of the base plate adjacent to the fore and aft end parts of the battery pack so that the battery pack is allowed to extend over the entire width of the vehicle. Thereby, a relatively large battery pack can be accommodated in the limited space of the vehicle.

However, it has been noted that the securing straps extending in the fore and aft direction provide a limited retaining force against the lateral tilting movement of the battery modules. In particular, it is desired to retain the battery pack in a secure manner even when subjected to a lateral impact that could be caused by a side crash.

SUMMARY OF THE INVENTION

The present invention was made in view of such problems of the prior art, and has a primary object to provide a battery pack for an electric vehicle which allows the battery pack to be accommodated over a substantially entire width of the vehicle so as to maximize the power capacity of the battery pack while ensuring the battery pack to be retained in a highly stable manner.

The present invention accomplishes such an object by providing a battery pack for an electric vehicle, comprising: a base plate (162); a plurality of rectangular battery modules (200) positioned laterally one next to another; a securing strap (204) provided for each battery module and including an upper portion (204A) extending along an upper surface of the corresponding battery module in a fore and aft direction, a front portion (204B) extending downward from a front end of the upper portion along a front surface of the corresponding battery module, a rear portion (204C) extending downward from a rear end of the upper portion along a rear surface of the corresponding battery module, a front mounting portion (204D) formed in a lower end of the front portion and secured to the base plate, a rear mounting portion (204E) formed in a lower end of the rear portion and secured to the base plate; and a connecting plate (218) extending laterally and fixedly connected to the securing straps.

In this arrangement, because the multiple battery modules that are arranged laterally one next to another are secured to one another by the connecting plate via the securing straps, the battery modules are retained securely against a tilting movement in the lateral direction. This is particularly enhanced by causing the lateral sides of the battery modules to abut one another by filling the gaps between the adjoining battery modules with spacers. Thereby, the battery modules can be held securely against lateral impacts.

Preferably, the connecting plate is connected to the upper portions of the securing straps.

Because the connecting plate is connected to the upper portions of the securing straps, the lateral tilting of the battery modules can be most effectively prevented.

Preferably, the connecting plate is integrally provided with an extension plate (220) which is bent onto front sides or rear sides of the battery modules along a bend line (L5) extending in a lateral direction.

Thereby, the bending stiffness of the connecting plate is enhanced so that the restraining action of the securing straps can be reinforced.

Preferably, each securing strap is formed with a laterally extending bend line (L1) between the upper portion and the front portion, and a laterally extending bend line (L2) between the upper portion and the rear portion.

The twisting stiffness of the securing straps can be improved owing to the presence of the bend lines so that the battery modules can be retained in a highly stable manner.

Preferably, the front mounting portion is bent from the lower end of the front portion along a laterally extending bend line (L3), and the rear mounting portion is bent from the lower end of the rear portion along a laterally extending bend line (L4).

This further enhances the twisting stiffness of the securing straps.

Preferably, lower parts of the front portion and the rear portion, and the front and rear mounting portions are wider than a remaining part of the securing strap, and the mounting portions are detachably attached to the base plate via fasteners (206).

The width of each securing strap is optimized for each different part of the securing strap so that the necessary mechanical strength and stiffness can be ensured while minimizing the weight of the securing strap.

In a preferred embodiment of the present invention, the base plate is provided with a projection (163, 167) for restricting lateral movement of at least one of the battery modules.

Thereby, the battery modules are prevented from shifting laterally so that the battery modules are fixedly secured by the securing straps in an even more stable manner.

Preferably, each battery module is provided with a projection (212) configured to engage an edge of the corresponding securing strap.

Thereby, the battery modules are prevented from shifting laterally so that the battery modules are fixedly secured by the securing straps in an even more stable manner.

A spacer (202) may be interposed between each adjoining pairs of the battery modules so that the lateral tilting of the battery modules may be prevented even more effectively.

In a preferred embodiment of the present invention, each battery module is rectangular in shape, and has a greater fore and aft dimension than a lateral dimension and a vertical dimension thereof.

Thereby, a maximum number of battery modules can be accommodated in a limited space of the vehicle.

DESCRIPTION OF THE PREFERRED EMBODIMENT(S)

An embodiment of an electric vehicle carrying a battery pack according to the present invention is described in the following with reference to the appended drawings.

Figure 1:
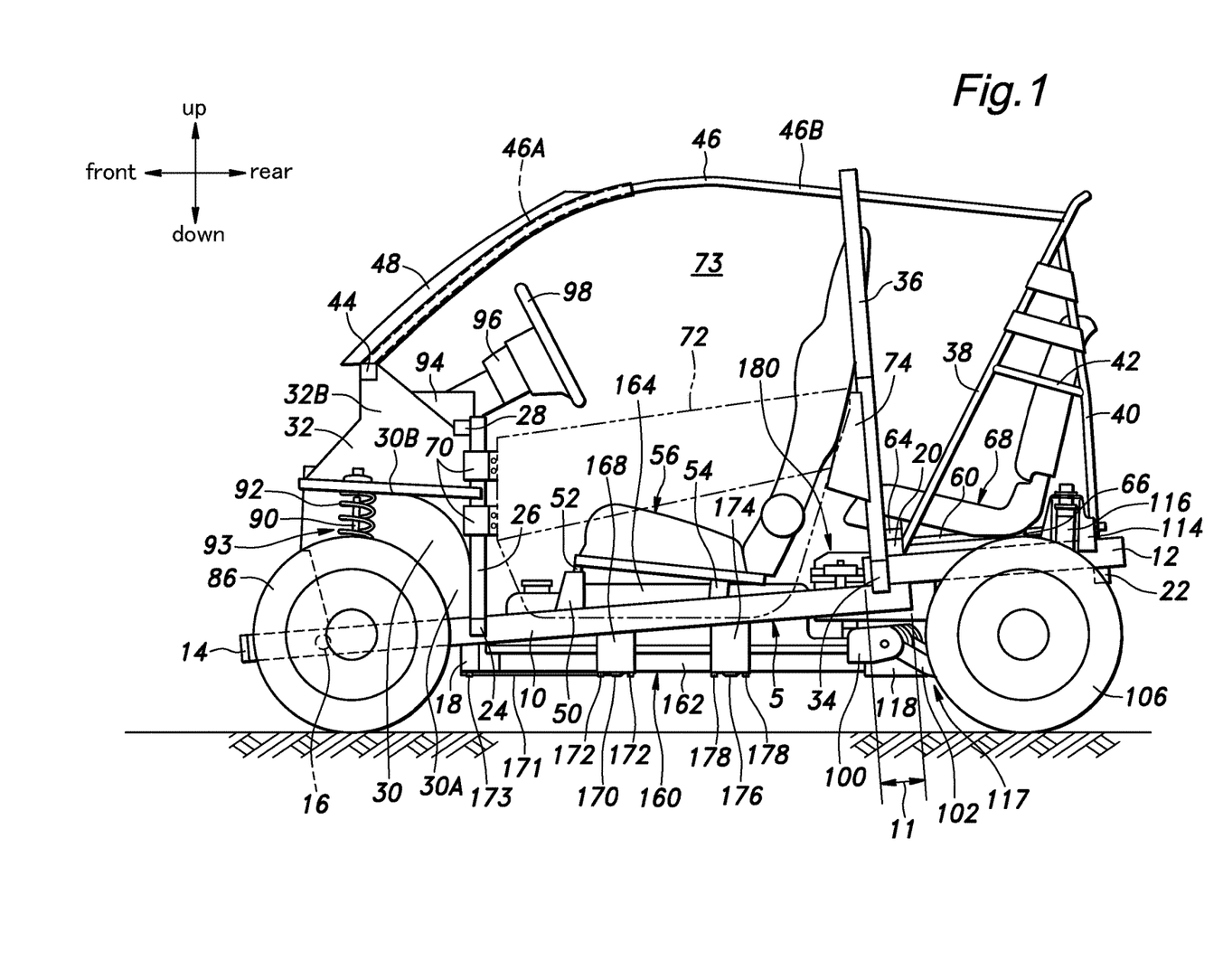
FIG. 1 is a side view of an electric vehicle provided with a battery pack according to the present invention.

This electric vehicle includes a lower frame 5 (chassis) mainly consisting of a pair of front side frames 10 and a pair of rear side frames 12.

Each front side frame 10 consists of an elongated steel pipe having a rectangular cross section, and extends linearly from the front end of the vehicle to a part adjoining a rear wheel 106 (which will be described hereinafter) with an upward slant angle (about five degrees, for instance) and an outboard spread angle toward the rear end thereof. Therefore, the front side frames 10 define a trapezoidal shape having a long side in the rear end thereof in plan view.

Each rear side frame 12 consists of a relatively short steel pipe having a rectangular cross section. The front end of the rear side frame 12 is placed on top of the upper side of a rear end part of the corresponding front side frame 10 via an overlapping part 11 with a prescribed overlap (in the fore and aft direction), and is welded thereto. The rear side frame 12 extends rearward from the part adjoining the rear wheel 106 to the rear end of the vehicle with an upward slant angle similar to that of the front side frame 10, and in parallel to the other rear side frame 12.

The lower frame 5 further includes a front end cross member 14 (made of a steel pipe having a rectangular cross section) connected to the front ends of the front side frames 10 at two ends thereof to extend horizontally and laterally, a first front middle cross member 16 (made of a steel pipe having a circular cross section) connected to the inboard sides of parts of the front side frames 10 adjacent to the front ends of the respective front side frames 10 at two ends thereof to extend horizontally and laterally, and a second front middle cross member 18 (made of a steel pipe having a rectangular cross section) connected to the bottom sides of intermediate parts of the front side frames 10 at two ends thereof to extend horizontally and laterally.

The lower frame 5 additionally includes a rear middle cross member 20 (made of a steel pipe having a rectangular cross section) connected to parts of the rear side frames 12 adjacent to the front ends thereof or to the top sides of the overlapping parts 11 at two ends thereof to extend horizontally and laterally, and a rear end cross member 22 (made of a steel pipe having a rectangular cross section) connected to the bottom sides of parts of the rear side frames 12 adjacent to the rear ends thereof at two ends thereof to extend horizontally and laterally.

The lower frame 5 of the electric vehicle of this embodiment thus forms a ladder type chassis.

The electric vehicle of this embodiment further includes a pair of sub side frames 118 (made of steel pipes having a rectangular cross section) extending in the fore and aft direction in relatively inboard parts of the vehicle adjacent to the rear middle cross member 20 in a mutually parallel relationship. The front end of each sub side frame 118 is connected to the rear end of the front side frames 10 via a rear suspension bracket 100 (which will be described hereinafter), and the rear end of the sub side frame 118 is connected to the lower end of a corresponding side stay 120 depending from an intermediate part of the corresponding rear end cross member 22. A sub cross member 122 extends between the front ends of the sub side frames 118. The two side stays 120 are connected to each other by a pair of sub end cross members 124 and 126 which extend laterally and horizontally in a vertically spaced apart relationship.

An extension member 24 (made of a short steel pipe having a rectangular cross section) extends in the outboard direction from a part of the outboard side of each front side frame 10 substantially corresponding to the position of the second front middle cross member 18. The free end of each extension member 24 is connected to the lower end of a corresponding front lower pillar 26 (A-pillar). The front lower pillars 26 extend vertically from the respective extension members 24, and a steering hanger frame 28 (made of a steel pipe having a rectangular cross section) extending laterally and horizontally is connected between the upper ends of the extension members 24.

Each front side frame 10 is fitted with a damper housing 30 (made of a single piece of stamp formed sheet steel) including a vertical wall 30A extending vertically from the corresponding front side frame 10 and a flange wall 30B extending horizontally from an edge of the vertical wall 30A and concentrically around the center of the corresponding front wheel (which will be described hereinafter). The upper parts of the two damper housings 30 are connected to each other by a cowl panel 32.

The rear middle cross member 20 is substantially longer than the distance between the rear side frames 12, and is therefore provided with a pair of end parts 20A extending in the outboard direction beyond the respective rear side frames 12. A rear pillar base frame 34 (made of a short steel pipe having a rectangular cross section) which extends vertically is attached to the front side of each end part 20A and the outboard side of the corresponding overlapping part 11 (the front side frame 10 and the rear side frame 12), and a center pillar 36 (B-pillar) is attached to the front side of the corresponding end part 20A and the outboard side of the corresponding rear pillar base frame 34 at the lower end thereof. The upper ends of the center pillars 36 is connected to each other by an upper cross member.

A roll bar 38 is connected to the rear middle cross member 20. To reinforce the roll bar 38, a pair of rear support bars 40 (C-pillars) connect respective upper parts of the roll bar 38 to rear end parts of the respective rear side frames 12, and a pair of reinforcement bars 42 connect middle parts of the respective rear support bars 40 to corresponding middle parts of the roll bar 38.

The cowl panel 32 includes a front wall 32A extending substantially laterally and vertically and a pair of side walls 32B extending rearward from either side edge of the front wall 32A. A cowl upper frame 44 is attached to the upper edge of the front wall 32A, and is connected between the two side walls 32B at the two ends thereof. Front ends of a pair of roof frames 46 (each made of a steel pipe having a circular cross section) are connected to the cowl upper frame 44. Each roof frame 46 includes a front upper pillar section 46A extending rearward from the cowl upper frame 44 with an upward slant, and a roof side rail section 46B extending horizontally from the rear end of the corresponding front upper pillar section 46A and, after passing by an upper end part of the corresponding center pillar 36, is connected to a corresponding upper end part of the roll bar 38.

Between the front upper pillar sections 46A is connected a rectangular windshield retaining frame 48 fitted with a sheet of windshield glazing.

A mounting bracket 50 is attached to the upper surface of an intermediate part of each front side frame 10. A laterally and horizontally extending front seat support member 52 made of a square pipe is mounted on the mounting brackets 50 at respective lateral ends thereof. A laterally and horizontally extending rear seat support member 54 is attached between parts of the front side frames 10 located behind the mounting brackets 50. A front seat 56 for a driver is mounted on the front seat support member 52 and the rear seat support member 54 in a detachable manner.

Although not shown in the drawings, a floor panel is provided between the two damper housings 30, and supports the feet of the driver seated on the front seat 56 while the lower part of the cowl panel 32 defines a leg room for the driver. As the power unit is not carried in the front part of the vehicle body, the front part of the vehicle body affords an ample space for the driver.

The rear part of the vehicle body includes a center frame 60 extending horizontally in the fore and aft direction and having a front end attached to a laterally intermediate part of the rear middle cross member 20. The rear end of the center frame 60 is attached to a laterally intermediate part of the rear end cross member 22 via a bracket 58. The rear part of the vehicle further includes a seat mount frame 62 extending laterally and horizontally between a longitudinally intermediate part of the center frame 60 and an intermediate part of the left rear side frame 12. A pair of seat mount members 64 are attached to the middle cross member 20 in a laterally spaced apart relationship, and another pair of seat mount members 66 are attached to the seat mount frame 62 in a laterally spaced apart relationship in a corresponding manner. A rear seat 68 for a single passenger is mounted on these seat mount members 64 and 66 in a detachable manner. In the illustrated embodiment, whereas the front seat 56 is positioned in a laterally central part of the vehicle body, the rear seat 68 is offset to the left from the laterally center part of the vehicle body.

Each front lower pillar 26 is fitted with a pair of door hinges 70 for a side door 72, and each center pillar 36 is fitted with a door lock 74 for selectively retaining the side door 72 in the closed position.

A side door opening 73 which can be closed and opened by the corresponding side door 76 is defined on each side of the vehicle body. The driver seated on the front seat 56 can get into and out of the vehicle through this door opening 73, and the passenger seated or to be seated on the rear seat 68 can also get out or into of the vehicle through this door opening 73 but only after tilting the seat back of the front seat 56 to the front.

A front suspension bracket 80 is fixedly attached to the outboard side of a front end part of each front side frame 10, and pivotally supports the base end of a lower arm 82 around a horizontally and longitudinally extending rotational center line. The lower arm 82 extends in the outboard direction, and rotatably supports a front wheel 86 at the free end thereof via a hub (not shown in the drawings).

The two lower arms 82 are connected to each other by a stabilizer bar 88 which is in turn supported by the front side frames 10 via brackets 87 mounted on the respective front side frames 10.

In association with each front wheel 86, a damper 90 and a suspension spring 92 (consisting of a compression coil spring) are connected between the corresponding damper housing 30 and the corresponding lower arm 82 so as to form a strut type wheel suspension system.

A steering column 96 is attached to the steering hanger frame 28 via a column mount 94. A steering wheel 98 is attached to the upper end of the steering column 96, and the lower end of the steering column 96 is connected to a per se known steering device not shown in the drawings which steers the front wheels 86 according to the rotational angle of the steering wheel 98.

A rear suspension bracket 100 is attached to the bottom surface of a rear end part of each front side frame 10. A bifurcated base end (front end) of a semi-trailing arm 102 is attached to each rear suspension bracket 100 so as to be pivotable around a rotational center line extending substantially horizontally with a certain slant in plan view (such that the outboard side of the rotational center line is located ahead of the inboard side thereof). The rear end of each semi-trailing arm 102 extending rearward rotatably supports a rear wheel 106 in a rotatable manner via a hub 104.

A lateral rod 130 connects the rear end of each semi-trailing arm 102 with a part of the sub side frame 118 of the corresponding side in a pivotable manner.

An upper spring seat member (not shown in the drawings) is attached to an intermediate part of each rear side frame 12, and projects in the outboard direction. A corresponding lower spring seat member 110 is attached to an intermediate part of each semi-trailing arm 102. A rear suspension spring (not shown in the drawings) consisting of a compression coil spring is interposed between each lower spring seat member 110 and the corresponding upper spring seat member.

An upper bracket 114 extends upward from a rear end part of each rear side frame 12, and a damper 116 is interposed between an upper end of the upper bracket 114 and a free end part of the corresponding semi-trailing arm 102. Thereby, a pair of rear suspension systems 117 each consisting of a per se known semi-trailing arm suspension system are configured.

A power unit 140 enclosed in a liquid tight casing is positioned between the two rear side frames 12, supported by the sub cross member 122 via a side motor bracket 146 at the right side part thereof, the sub cross member 122 via a front motor bracket 147 at the front end thereof, and the sub end cross members 124 and 126 via a rear end bracket 148 at the rear end thereof. The power unit 140 includes an electric motor 142 consisting of a PM motor and a reduction gear unit 144 consisting of a plurality of gears.

A pair of axle shafts 150 extend from either side of the power unit 140 in either lateral direction via respective universal joints 152, and the outer end of each axle shaft 150 is connected to the corresponding rear wheel 106 so that the rear wheels 106 are rotatively driven by the electric motor 142.

A battery pack (battery unit) 160 includes a plurality of battery modules 200 each typically consisting of lithium iron rechargeable battery cells (FIG. 4), and is encased in a gas tight casing 166 which consists of a longitudinally elongated rectangular base plate 162 and an upper case 164 having a prescribed height and secured to the base plate 162 along the outer periphery by using threaded bolts. A charging unit 186 (FIG. 3) is provided on an outboard side of the electric motor 142. The charging unit 186 includes an onboard charger for charging the battery pack 160.

As shown in FIG. 1, a front battery mount 168 and a rear battery mount 174 are attached to the bottom surface of an intermediate part of each front side frame 10 one behind the other. A front battery mount band 170 consisting of metallic band extends laterally across the bottom surface of the battery pack 160, and each end of the front battery mount band 170 is attached to the lower surface of the corresponding front battery mount 168 by using a pair of threaded bolts 172. Similarly, a rear battery mount band 176 consisting of metallic band extends laterally across the bottom surface of the battery pack 160 behind the front battery mount band 170, and each end of the rear battery mount band 176 is attached to the lower surface of the corresponding rear battery mount 174 by using a pair of threaded bolts 178, in a detachable manner in each case. A pair of front battery mount plates 171 extend in the fore and aft direction between the front battery mount band 170 and the second front middle cross member 18 in a mutually parallel relationship. The rear ends of the front battery mount plates 171 are welded to the front battery mount band 170 and the front ends of the front battery mount plates 171 are detachably attached to the second front middle cross member 18 via threaded bolts 173.

The front battery mount band 170, the front battery mount plates 171 and the rear battery mount band 176 extend horizontally at a same elevation so that the bottom surface of the base plate 162 is supported horizontally.

Thus, the front battery mount band 170, the front battery mount plates 171 and the rear battery mount band 176 can be removed in the downward direction by loosening the threaded bolts 172, 173 and 178. Therefore, when the battery pack 160 is required to be removed for maintenance or servicing purposes, the battery pack 160 can be removed in the downward direction simply by removing the front battery mount band 170, the front battery mount plates 171 and the rear battery mount band 176.

The battery pack 160 which is elongated in the fore and aft direction is placed horizontally under the front seat 56 between the two front side frames 10 so as to overlap with the front side frames 10 in side view. Because the front side frames 10 slant upward toward the rear ends thereof while the battery pack 160 is placed horizontally, the front side frames 10 extend diagonally from a lower front point to an upper rear point of the upper case 164 in side view along the either side of the upper case 164.

According to this arrangement, the lower part and the bottom part of the battery pack 160 protrude downward from the front side frames 10 so that the battery pack 160 is directly exposed to the wind created by the motion of the vehicle, and is thereby favorably cooled. The base plate 162 directly opposes the road surface, and serves as a protector for protecting the battery modules 200 in the casing 166 from gravels and other foreign matters that may be kicked up from the road surface.

Figure 3:
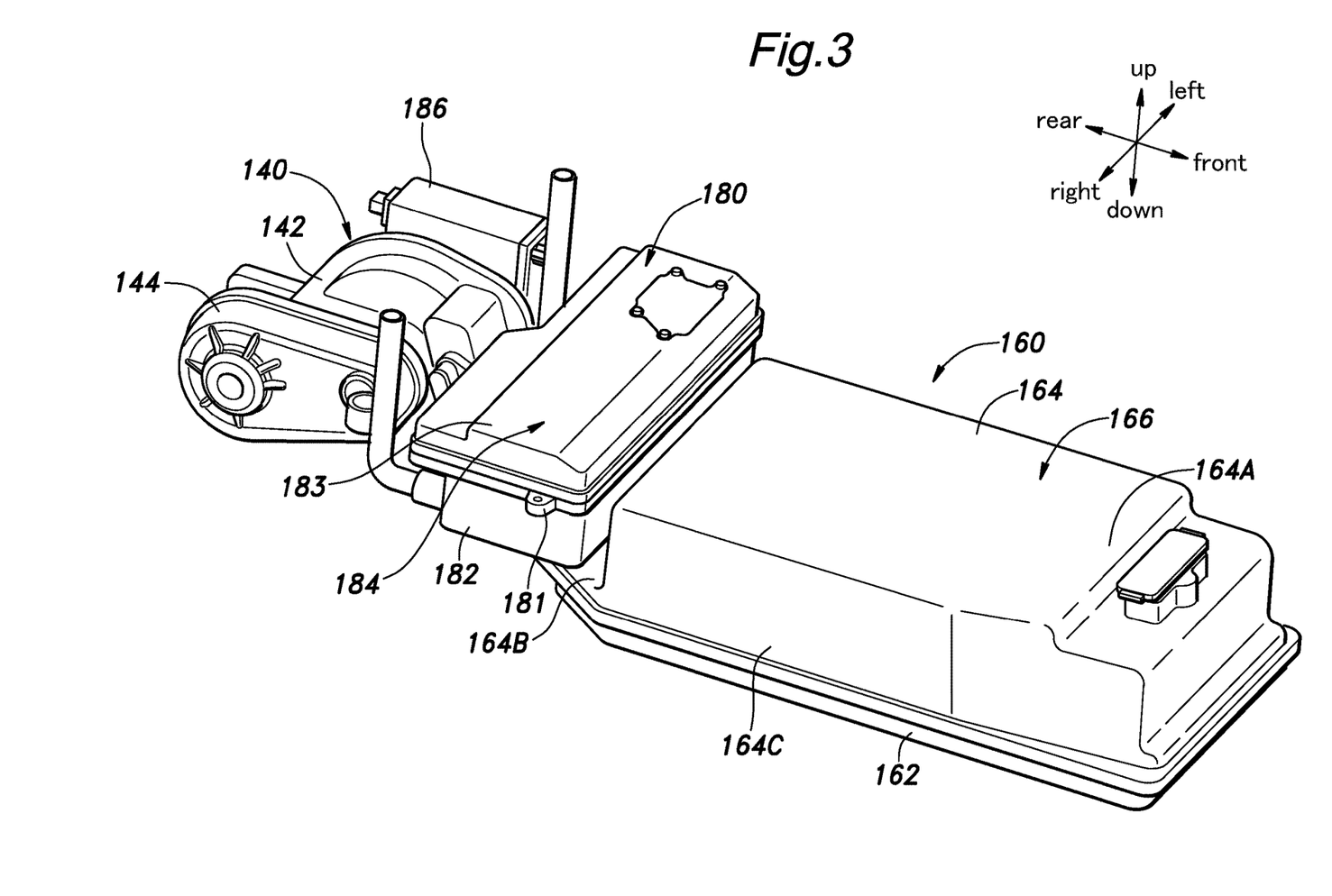
FIG. 3 is a perspective view of the battery pack, a power control unit and a power unit of the electric vehicle.

As shown in FIG. 3, a front part 164A of the upper case 164 is given with a slight taper in plan view so as to be accommodated in the space between the front side frames 10 which gets narrower toward the front. On the other hand, the base plate 162 is generally rectangular in shape because the base plate 162 extends horizontally under the front side frames 10, and does not interfere with the front side frames 10.

The battery pack 160 which is interposed between the front side frames 10 extends in the longitudinal direction from the second front middle cross member 18 (corresponding to the front lower pillars 26 in the fore and aft direction) to the overlapping parts 11 (corresponding to the center pillars 36 in the fore and aft direction). Thus, the substantially entire space under the front seat 56 surrounded by the two front side frames 10, the front lower pillars 26 and the sub cross member 122 having a high mechanical strength is utilized for housing the battery pack 160 so that the battery pack 160 can be favorably protected from external impacts.

As shown in FIG. 3, the casing 166 is provided with a lower extension 164B extending rearward which is formed jointly by the base plate 162 and the upper case 164 and has a reduced height. The lower extension 164B does not contain any battery modules, but power cables, signal lines and accessory devices. Thus, while the base plate 162 extends horizontally over the entire part of the casing 166, the upper surface of the lower extension 164B is significantly lower than that of the main part 164C of the casing 166.

A power control unit 180 enclosed in an air tight electric box 184 consisting of a lower case 182 and an upper case 183 is positioned in a space created above the lower extension 164B. The power control unit 180 consists of an electric power conversion unit 186 including an inverter (not shown in the drawings) and a DC-DC converter (not shown in the drawings), and an electronic control unit (ECU) 188 for controlling the supply of electric power to the electric motor 142. The electric box 184 is fixedly attached to the front side frames 10 via brackets 181 integrally formed with either side of the electric box 184. Thus, the power control unit 180 overlaps with the lower extension 164B of the battery pack 160 in plan view.

The power control unit 180 is positioned laterally between the front side frames 10 and the rear side frames 12, and longitudinally between the main part 164C of the battery pack 160 and the power unit 140. Also, the power control unit 180 overlaps with the main part 164C of the battery pack 160 in front view.

Figure 2:
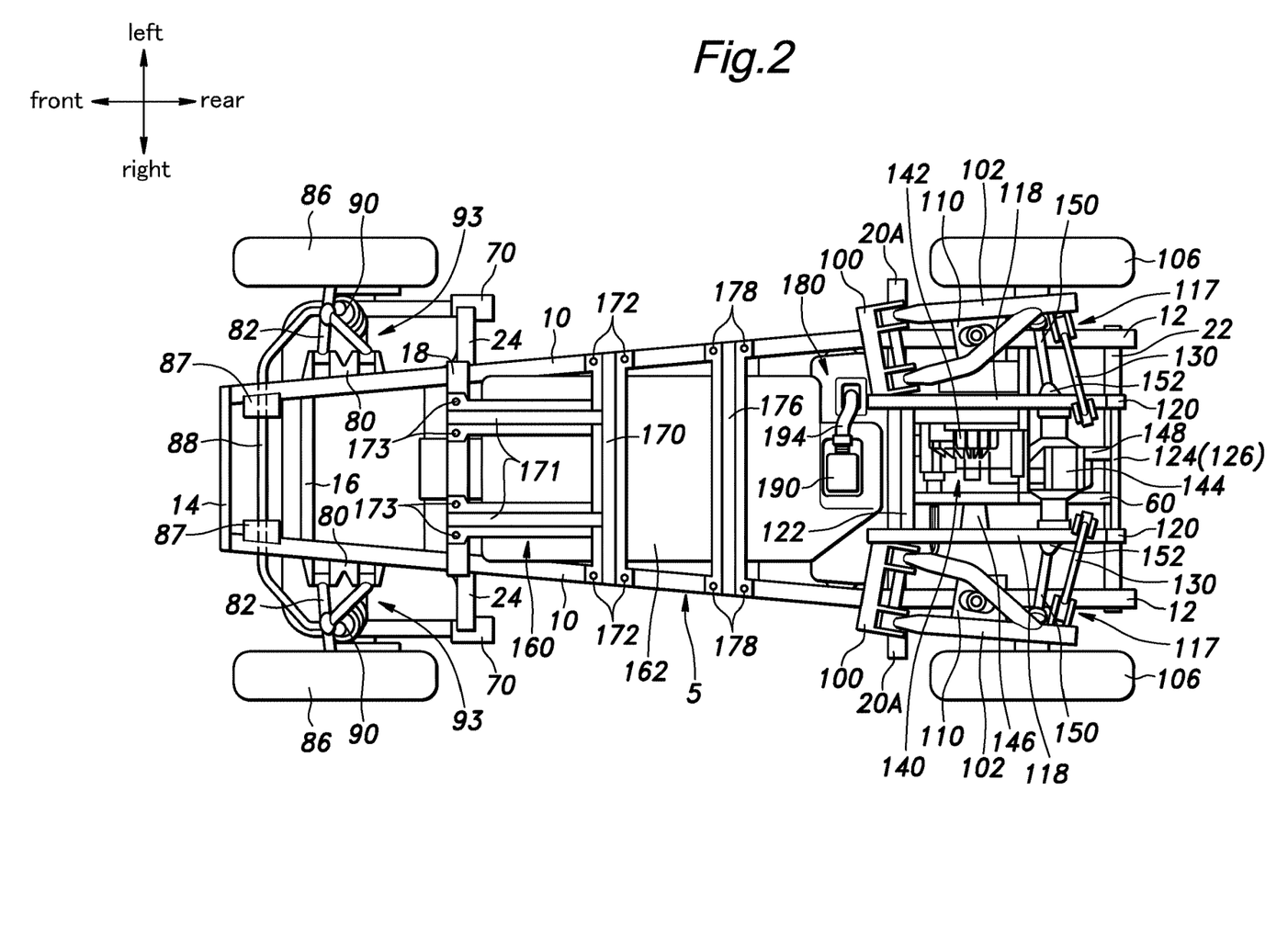
FIG. 2 is a bottom view of the electric vehicle.

As shown in FIG. 2, a tube joint 190 protrudes from the lower surface of the lower extension 164B, and a hose 194 is connected to the tube joint 190. The other end of the hose 194 is connected to the bottom surface of the lower case 182 of the electric box 184 in a detachable manner. The hose 194 receives cables (not shown in the drawings) electrically connecting the battery pack 160 to the power control unit 180. The end of the hose 194 on the side of the lower case 182 is located at the bottom end of the lower case 182 which is readily accessible from under the vehicle.

The details of the battery pack 160 are described in the following with reference to FIGS. 4 to 7.

Figure 4:
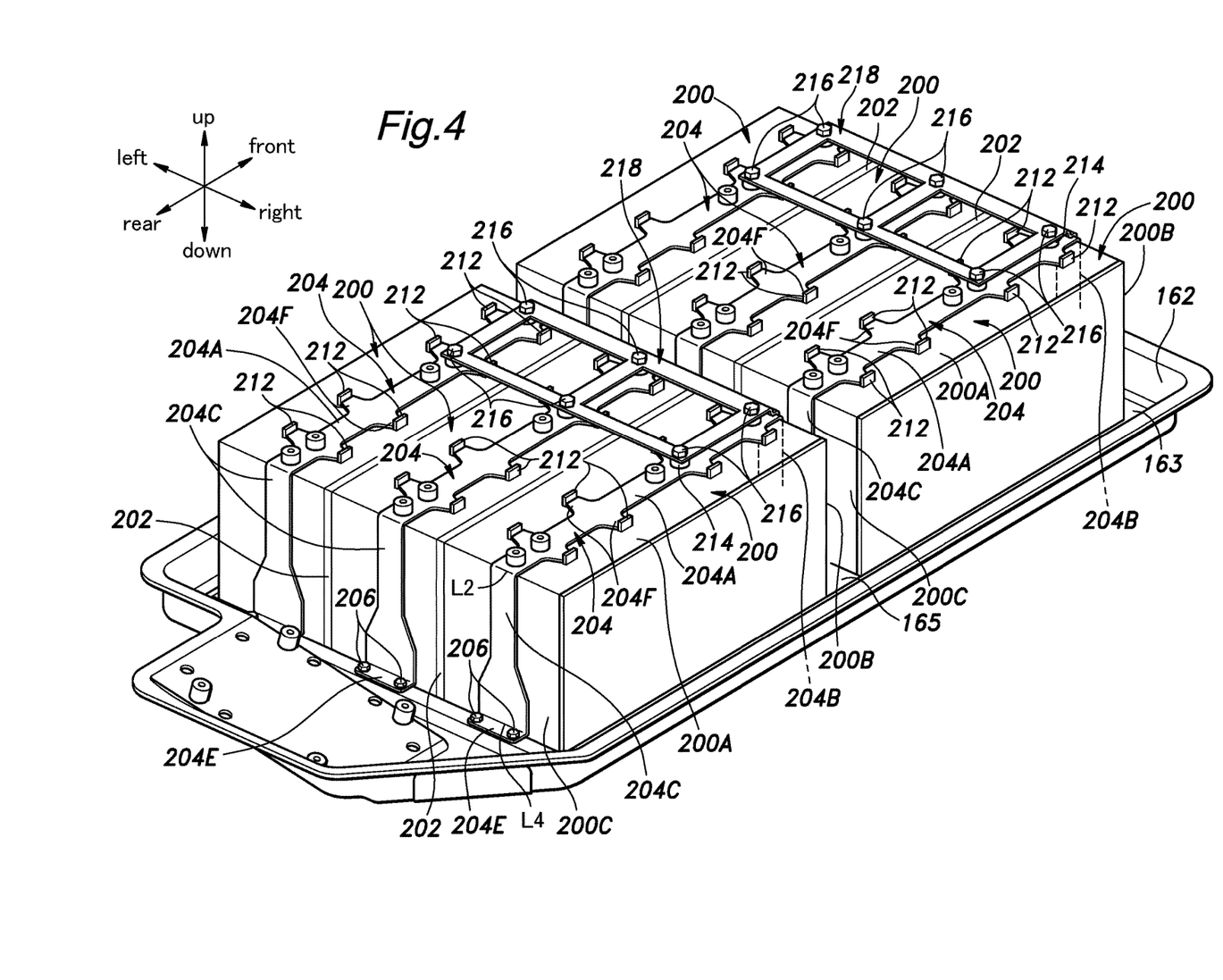
FIG. 4 is a perspective view showing battery modules and securing straps of the battery pack.
Figure 5:
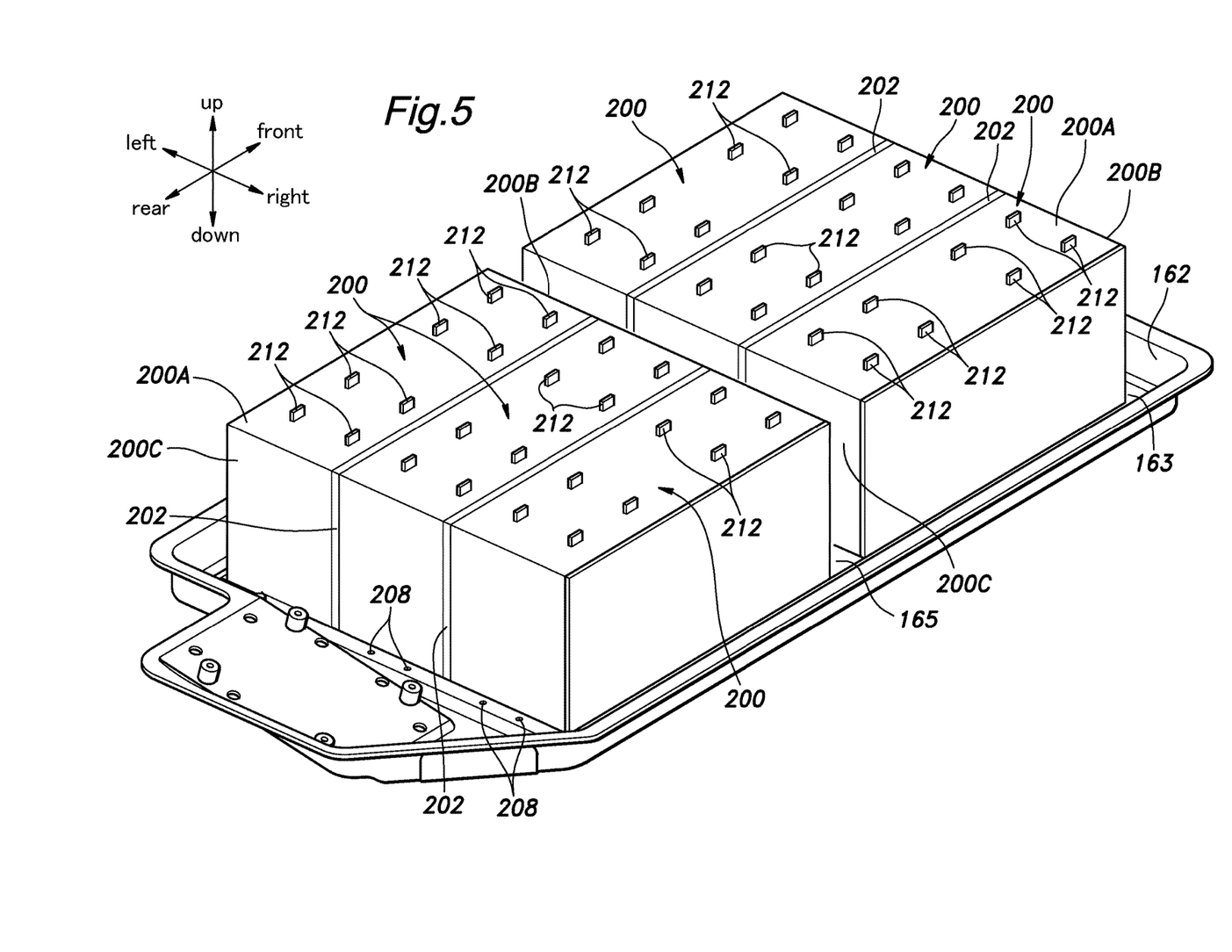
FIG. 5 is a perspective view of the battery modules.

As shown in FIGS. 4 and 5, each battery module 200 is rectangular in shape, and has a fore and aft dimension greater than the lateral dimension thereof and the vertical dimension thereof.

The base plate 162 is configured as a tray having a planar bottom part 162A (see FIG. 6), and as shown in FIGS. 4 and 5, supports the battery modules 200 arranged such that three of them are placed laterally next to each other, and another three of them are placed laterally next to each other immediately behind the first three battery modules 200. The bottom part 162A includes a rectangular outer frame member 163 (having a rectangular cross section) extending along the rectangular outer periphery thereof, and a central bar 165 (having a rectangular cross section) extending linearly and laterally between longitudinally intermediate points of the outer frame member 163 so that the bottom part 162A is divided into two equal rectangular parts, one in the front and the other in the rear. Each of the rectangular parts of the bottom part 162A is separated into three equal rectangular parts by a pair of ribs 167 extending in the fore and aft direction.

Figure 6:
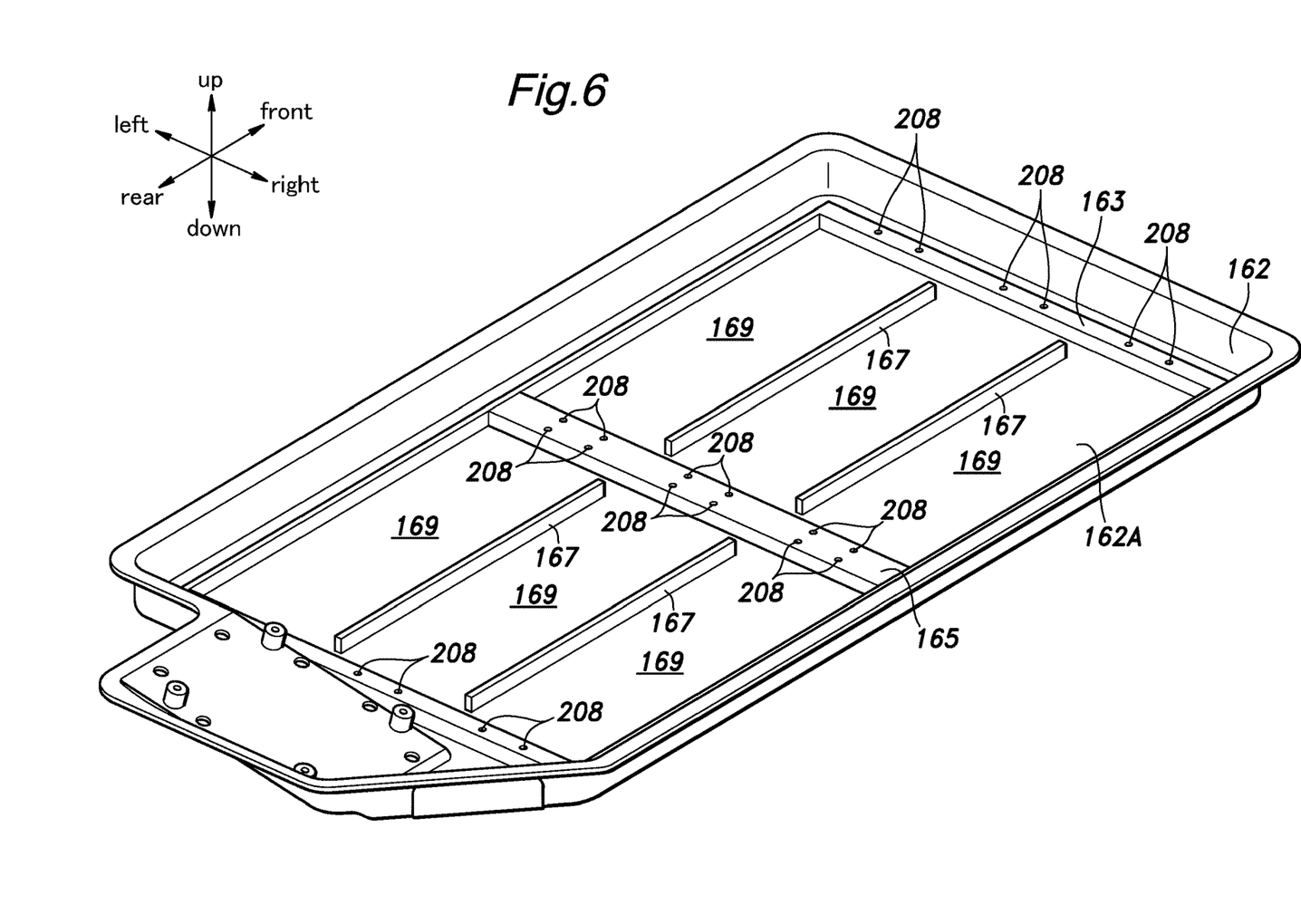
FIG. 6 is a perspective view of a base plate of the battery pack.

The outer frame member 163, the central bar 165 and the ribs 167 jointly define six equal module compartments 169 each of which accommodates a corresponding one of the battery modules 200. Each battery module 200 is thus held immobile in the fore and aft direction and the lateral direction by the corresponding parts of the outer frame member 163, the central bar 165 and the ribs 167. To ensure that each battery module 200 is held in a stable manner, a spacer 202 consisting of a plate member is interposed between each laterally adjoining pair of the battery modules 200.

Each battery module 200 is fixedly attached to the base plate 162 by an individually securing strap 204 which is made of steel sheet bent into the shape of a staple, and includes an upper portion 204A extending in the fore and aft direction along the upper surface 200A of the corresponding battery module 200. As shown in FIG. 4, the upper portion 204A extends longitudinally along a substantially central portion of the corresponding battery module 200. Each securing strap 204 also includes a front portion 204B extending vertically from the front end of the upper portion 204A along the front surface 200B of the battery module 200, a rear portion 204C extending vertically from the rear end of the upper portion 204A along the rear surface 200C of the battery module 200, and mounting portions 204D, 204E formed by bending the lower end part of each of the front portion 204B and the rear portion 204C outwardly.

Figure 7:
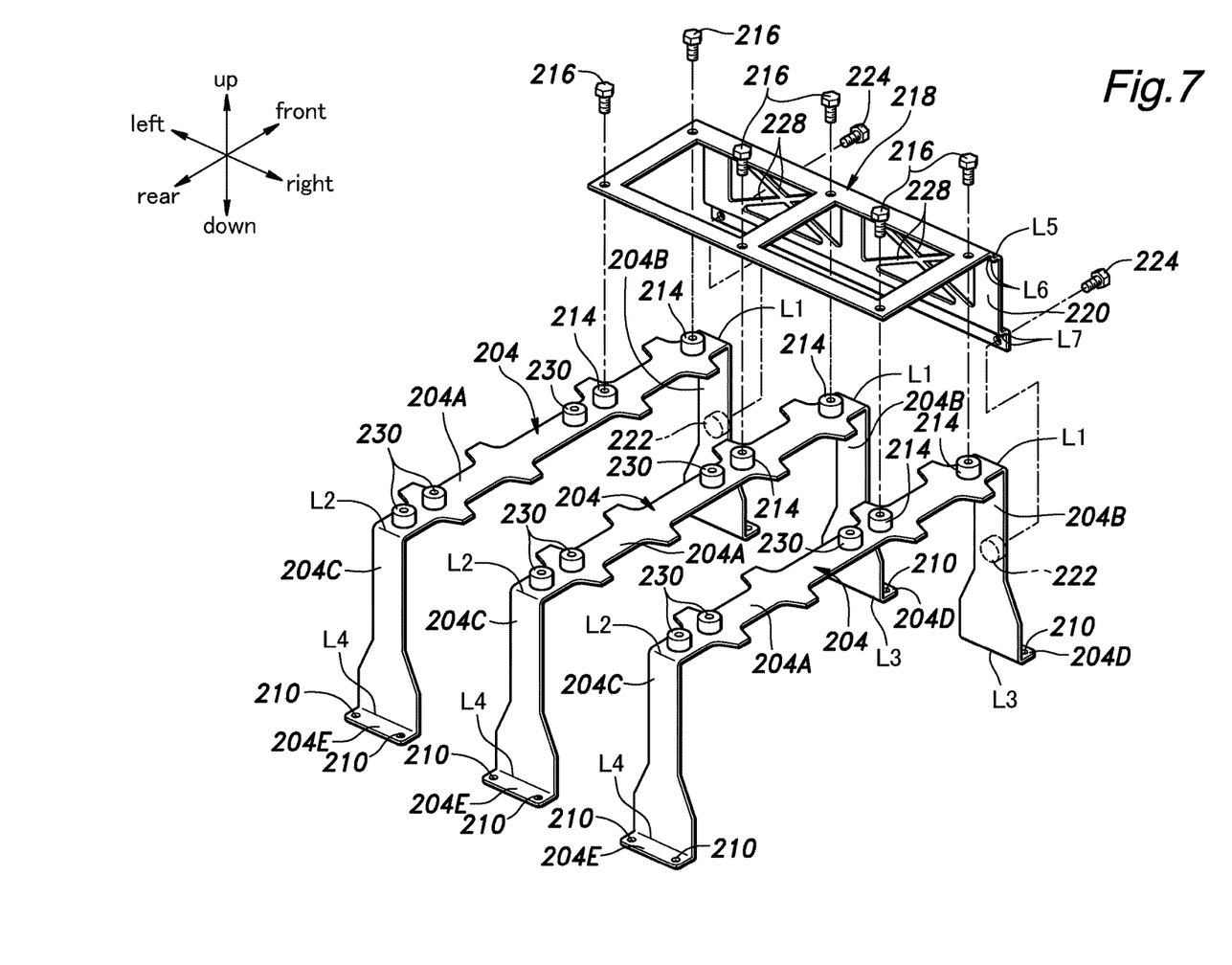
FIG. 7 is an exploded perspective view of the securing straps and a connecting plate/extension plate attached to the securing straps.

Thus, as shown in FIG. 7, each securing strap 204 is bent into the shape of a staple along four laterally extending bend lines L1, L2, L3 and L4, between the upper portion 204A and the front portion 204B, between the upper portion 204A and the rear portion 204C, between the front portion 204B and the mounting portion 204D, and between the rear portion 204C and the mounting portion 204E, respectively.

Because each securing strap 204 is bent along a large number of bend lines L1 to L4, a high stiffness against twisting deformation can be achieved so that the corresponding battery module 200 can be secured with a high level of stability.

As shown in FIG. 4, each securing strap 204 surrounds the corresponding battery module 200, and is detachably secured to the base plate 162 at the mounting portions 204D and 204E via threaded bolts 206. The central bar 165 and the front and rear sections of the outer frame member 163 are formed with threaded holes 208 (FIGS. 5 and 6) on the upper surfaces thereof to accept the corresponding threaded bolts 206. Therefore, more precisely, each securing strap 204 is attached to the central bar 165 and the outer frame member 163.

In the illustrated embodiment, a lower end part of the front portion 204B, a lower end part of the rear portion 204C, and the mounting portions 204D and 204E are wider than the remaining part of the securing strap 204, and each mounting portion 204D, 204E is provided with a pair of mounting holes 210 arranged along the widthwise direction.

Owing to this arrangement, an adequate mechanical stiffness can be ensured while minimizing the overall weight of the securing strap 204. Also, the mounting portions 204D and 204E are wide enough to accommodate the two threaded bolts 206.

Each securing strap 204 attached to the base plate 162 contacts a laterally central region of the upper surface 200A of the battery module 200 at the upper portion 204A, a laterally central region of the front surface 200B at the front portion 204B and a laterally central region of the rear surface 200C at the rear portion 204C.

Four pairs of projecting pieces 212 are provided on the upper surface 200A of each battery module 200 along the fore and aft directions. The upper portion 204A of each securing strap 204 is provided with four pairs of lateral extensions 204F such that the free ends of these lateral extensions 204F abut the inner sides of the respective projecting pieces 212.

Therefore, each securing strap 204 prevents lateral movement of the corresponding battery module 200 so that the battery module 200 can be retained in a secure and stable manner. In particular, the securing strap 204 is effective in preventing the lateral tilting of the battery module 200, and the lateral shifting of the battery module 200 is prevented by the corresponding ribs 167 of the base plate 162.

The front part of each upper portion 204A of the securing strap 204 is provided with a pair of nuts 214 which are welded to the upper portion 204A. The three securing straps 204 for the three battery modules 200 on the front side which are positioned laterally one next to the other are connected to a connecting plate 218 which is provided with six mounting holes corresponding to the nuts 214 by using threaded bolts 216 passed through the mounting holes and threaded into the respective nuts 214. Similarly, the three securing straps 204 for the three battery modules 200 on the rear side are connected to another connecting plate 218.

Each connecting plate 218 extends in the lateral direction, and prevents the lateral shifting of the corresponding three securing straps 204.

As best shown in FIG. 7, the front edge of each connecting plate 218 is integrally provided with an extension plate 220 extending downward along the front end surfaces 200B of the corresponding battery modules 200. In the illustrated embodiment, each connecting plate 218 and the corresponding extension plate 220 are formed by bending a single rectangular piece of sheet steel at a 90 degree angle so that a laterally extending bend line L5 is formed between the connecting plate 218 and the extension plate 220.

The lower end of the extension plate 220 is bent in the forward direction, and then in the downward direction, at a 90 degree angle in each case, so that a pair of laterally extending bend lines L6 and L7 are formed, and the lower edge of the extension plate 220 is slightly offset in the forward direction. A nut 222 is welded to a vertically intermediate point of the front surface of each of the front portions 204B of the securing straps 204 on either lateral end. The lower end of the extension plate 220 is formed with mount holes at positions corresponding to the nuts 222, and a threaded bolt 224 is passed through each mount hole of the extension plate 220, and threaded into the corresponding nut 222.

Each connecting plate 218 is formed with a pair of rectangular openings, and each extension plate 220 is similarly formed with a pair of rectangular openings. The extension plate 220 is provided with X-shaped braces 228 each extending diagonally across the corresponding rectangular opening.

Three additional nuts 230 are welded to the upper surface of the rear end part of the upper portion 204A of each securing strap 204. These nuts 230 are used for securing an electric device (not shown in the drawings) to the securing straps 204.

In the illustrated embodiment, the battery modules 200 each having a rectangular shape and having a greater fore and aft dimension than a lateral dimension or vertical dimension are arranged laterally one next to another on a rectangular base plate 162 which also has a greater fore and aft dimension than a lateral dimension, and each battery module 200 is secured to the base plate 162 by using a securing strap 204. Therefore, the lateral dimension of the battery back 160 can be maximized, owing to the absence of any mounting features on either lateral side of each battery module 200. Therefore, this arrangement is particularly beneficial for personal mobility vehicles having relatively small lateral dimensions.

Because each battery module 200 is elongated in the fore and aft direction, and the corresponding securing strap 204 is attached to the base plate 162 at the front and the rear ends thereof, a large number of battery modules can be accommodated, and each battery module can be secured in a stable manner.

Because the three battery modules 200 that are arranged laterally one next to another are secured to one another by the connecting plate 218 via the securing straps 204, the battery modules 200 are retained securely against a tilting movement in the lateral direction. This is particularly enhanced by causing the lateral sides of the battery modules 200 to abut one another by filling the gaps between the adjoining battery modules with the spacers 202. Thereby, the battery modules 200 can be held securely against lateral impacts.

Because the connecting plate 218 is connected to the upper portions 204A of the securing straps 204, the lateral tilting of the battery modules 200 can be most effectively prevented.

The connecting plate 218 is provided with the extension plate 220 so that the laterally extending bend line L5 is formed between the connecting plate 218 and the extension plate 220. As a result, the stiffness of the connecting plate 218 is significantly increased so that the connecting plate 218 is prevented from bending even under a severe side impact. This advantage is further enhanced by the presence of the bend lines L6 and L7 in the lower part of the extension plate 220.

Although the present invention has been described in terms of a preferred embodiment thereof, it is obvious to a person skilled in the art that various alterations and modifications are possible without departing from the scope of the present invention. For instance, the extension plate 220 may extend from the rear edge of the connecting plate 218 along the rear sides 200C of the battery modules 200 (instead of the front edge), and be attached to the rear portions 204C of the securing straps 204.

Also, only two battery modules may be arranged laterally one next to each other, or four or more battery modules may be arranged laterally one next to one another. The battery modules were arranged in two rows, one behind the other, in the foregoing embodiment, but may be arranged in a single row or three or more rows if required without departing from the spirit of the present invention.

The electric vehicle as used in this disclosure may include any vehicles having an electric motor as a primary source of power, and may consist of a hybrid vehicle combining an internal combustion engine and an electric motor.

The contents of the original Japanese patent application on which the Paris Convention priority claim is made for the present application as well as the contents of the prior art references mentioned in this application are incorporated in this application by reference.

The invention claimed is:

1. A battery pack for an electric vehicle, said battery pack comprising:
a base plate;
a plurality of rectangular battery modules positioned laterally one next to another on the base plate;
a plurality of securing straps, each securing strap provided for a corresponding one of said battery modules and including an upper portion extending longitudinally along an upper surface of the corresponding battery module, a front portion extending downward from a front end of the upper portion along a front surface of the corresponding battery module, a rear portion extending downward from a rear end of the upper portion along a rear surface of the corresponding battery module, a front mounting portion formed in a lower end of the front portion and secured to the base plate, and a rear mounting portion formed in a lower end of the rear portion and secured to the base plate; and
at least one connecting plate extending laterally and fixedly connected to a plurality of the securing straps.

2. The battery pack according to claim 1, wherein the connecting plate is connected to the upper portions of the securing straps.

3. The battery pack according to claim 1, wherein each securing strap is formed with a laterally extending bend line between the upper portion and the front portion, and a laterally extending bend line between the upper portion and the rear portion.

4. The battery pack according to claim 3, wherein the front mounting portion is bent from the lower end of the front portion along a laterally extending bend line, and the rear mounting portion is bent from the lower end of the rear portion along a laterally extending bend line.

5. The battery pack according to claim 4, wherein lower parts of the front portion and the rear portion, and the front and rear mounting portions are wider than a remaining part of the securing strap, and the mounting portions are detachably attached to the base plate via fasteners.

6. The battery pack according to claim 1, wherein the base plate is provided with a projection for restricting lateral movement of at least one of the battery modules.

7. The battery pack according to claim 1, wherein a spacer is interposed between each adjoining pairs of the battery modules.

8. The battery pack according to claim 1, wherein each battery module is rectangular in shape, and has a greater fore and aft dimension than a lateral dimension and a vertical dimension thereof.

9. An electric vehicle carrying the battery pack according to claim 1.

10. The battery pack according to claim 1, wherein each of the battery modules has a greater longitudinal dimension than a lateral dimension thereof.

11. The battery pack according to claim 1, wherein the upper portion of each securing strap extends longitudinally along a substantially central portion of the upper surface of the corresponding battery module.

12. A battery pack for an electric vehicle, said battery pack comprising:
a base plate;
a plurality of rectangular battery modules positioned laterally one next to another;
a securing strap provided for each battery module and including an upper portion extending along an upper surface of the corresponding battery module in a fore and aft direction, a front portion extending downward from a front end of the upper portion along a front surface of the corresponding battery module, a rear portion extending downward from a rear end of the upper portion along a rear surface of the corresponding battery module, a front mounting portion formed in a lower end of the front portion and secured to the base plate, and a rear mounting portion formed in a lower end of the rear portion and secured to the base plate; and
a connecting plate extending laterally and fixedly connected to the securing straps,
wherein the connecting plate is connected to the upper portions of the securing straps, and wherein the connecting plate is integrally provided with an extension plate which is bent onto front sides or rear sides of the battery modules along a bend line extending in a lateral direction.

13. A battery pack for an electric vehicle, said battery pack comprising:
a base plate;
a plurality of rectangular battery modules positioned laterally one next to another;
a securing strap provided for each battery module and including an upper portion extending along an upper surface of the corresponding battery module in a fore and aft direction, a front portion extending downward from a front end of the upper portion along a front surface of the corresponding battery module, a rear portion extending downward from a rear end of the upper portion along a rear surface of the corresponding battery module, a front mounting portion formed in a lower end of the front portion and secured to the base plate, and a rear mounting portion formed in a lower end of the rear portion and secured to the base plate; and
a connecting plate extending laterally and fixedly connected to the securing straps,
wherein each battery module is provided with a projection configured to engage an edge of the corresponding securing strap.

* * * * *